United States Patent Office 3,145,177
Patented Aug. 18, 1964

3,145,177
SYNERGISTIC ANTIOXIDANTS
Harold D. Orloff, Oak Park, and Gordon G. Knapp, Royal Oak, Mich., assignors to Ethyl Corporation, New York, N.Y., a corporation of Virginia
No Drawing. Filed May 2, 1960, Ser. No. 25,862
16 Claims. (Cl. 252—49.8)

This invention relates to improved organic material and in particular to the use of a synergistic combination of additives to protect organic material from deterioration.

Organic compositions including hydrocarbon fuels, lubricants and polymers are all subject to oxidative deterioration at elevated temperatures or upon prolonged exposure to the elements. In the case of lubricating compositions, gums and sludges, the corrosion of metal parts with which the oils come in contact, and the loss of lubricating properties result from this deterioration. As to polymeric compositions including natural rubber and polyethylene, oxidative deterioration causes the loss of desirable characteristics as well as an increase in weight. Hydrocarbon fuel compositions are deteriorated by oxygen during storage to form undesirable components in the fuel.

A principal object of this invention is to provide compositions of matter protected against oxidative deterioration. A further object is to provide synergistic compositions of additives which are highly effective in inhibiting the oxidative deterioration of hydrocarbon fuels, oils, greases, and polymeric and other organic compositions. Another object is to provide lubricating oil normally tending to deteriorate in the presence of oxygen containing, in amount sufficient to inhibit such deterioration, novel and highly effective antioxidant combinations. Still another object is to provide organic polymers, particularly polypropylene, stabilized against oxidative deterioration and discoloration by the presence therein of a small quantity of novel and highly effective antioxidant combinations. A still further object is to provide improved antiknock fluids. Another object is to provide stabilized edible material. Other important objects of this invention will be apparent from the following description.

The above and other objects of this invention are accomplished by providing, as new compositions of matter, organic material tending to deteriorate in the presence of air, oxygen, or ozone protected by a small quantity of a mixture of a 3,5-dialkyl-4-hydroxybenzyl ether having the general formula:

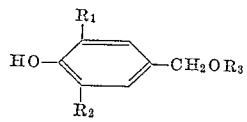

wherein $R_1$ is an alkyl group containing from 3 to 8 carbon atoms and is branched on the alpha carbon atom, $R_2$ is an alkyl group containing from 1 to 8 carbon atoms, and $R_3$ is selected from the group consisting of alkyl, cycloalkyl, aralkyl and alkenyl; and an organic dialkyl phosphonate having hydrogen bonded to phosphorus. In compounding the compositions of this invention, the benzyl ether is ordinarily employed in concentrations of from about 0.01 to about 5 percent based on the weight of the material to be protected while the organic hydrogen phosphate is employed in concentrations of from about 0.005 to about 1.5 weight percent of phosphorus based on the material to be protected.

Ordinarily when employing the synergistic antioxidant mixtures of this invention it is preferable to use from 0.025 to about 0.5 weight percent of phosphorus along with from 0.2 to about 1 percent by weight of the benzyl ether employed. These concentration ranges are preferred as synergistic antioxidant effectiveness of outstanding proportion has been observed in these ranges.

The additive combinations of this invention find important utility as antioxidants in a wide variety of oxygen sensitive materials; thus, liquid and solid products derived from petroleum crude are found to possess greatly increased storage stability by the use of an antioxidant of this invention. For example, gasoline jet fuel, kerosene, fuel oil, turbine oils, insulating oils, motor oils and various waxes have increased oxidative stability when they contain an antioxidant of this invention. Likewise, liquid hydrocarbon fuels which contain organometallic additives such as tetraethyllead and other organometallic compositions which are used as fuel additives attain appreciably increased oxidative stability by the practice of this invention. Furthermore, such fuels which contain halogen and phosphorus-containing scavengers for these organometallic compounds are benefited by the practice of this invention. In addition to increased storage stability, lubricating oils and functional fluids, such as automatic transmission and hydraulic fluids, both those derived from naturally occurring hydrocarbons and those synthetically prepared, achieve a high degree of resistance to oxidation during use at elevated temperatures by the practice of this invention. It has been found that lubricating oils may be employed at extremely high temperatures without undergoing oxidative degradation when protected by an antioxidant of this invention. The addition of small quantities of the compositions of this invention to such materials as hydraulic, transformer and other highly refined industrial oils as well as crankcase lubricating oils and lubricating greases prepared from these oils by the addition of metallic soaps, greatly increase their resistance to deterioration in the presence of air, oxygen or ozone. Furthermore, the organic soaps used in the preparation of lubricating greases are themselves stabilized by the practice of this invention.

Organometallic compositions such as tetraethyllead and tetraethyllead antiknock fluids containing halohydrocarbon scavengers, dyes and which may contain various phosphorus compounds and other organometallic additives are stabilized against deterioration during storage by the addition thereto of an antioxidant quantity of the compositions of this invention.

The compositions of this invention are also extremely effective antioxidants for elastomers including high molecular weight unsaturated hydrocarbon polymers both derived from naturally occurring sources and those synthetically prepared. Thus, natural rubbers and synthetic rubbers, including oil extended rubbers and sulfur vulcanized rubbers are greatly benefited by the practice of this invention. Examples of the synthetic rubbers protected by the practice of this invention include such synthetics as polybutadiene, methyl rubber, polybutadiene rubber, butyl rubber, GR-S rubber, GR-N rubber, piperylene rubber and dimethylbutadiene rubber.

The practice of this invention is also useful in protecting paraffin and micro-crystalline petroleum waxes against the oxidative deterioration which leads to rancidity. Furthermore, the compositions of this invention are extremely useful in the stabilization of fats and oils of animal or vegetable origin which become rancid during periods of storage due to oxidative deterioration. Typical animal fats benefited by the practice of this invention include butter fat, lard, beef tallow, fish oils—such as cod liver oil—as well as various foods containing or prepared in animal fats which tend to deteriorate. These include, for example potato chips, fried fish, donuts, crakers, and various types of pastry such as cakes and cookies. Furthermore, fat fortified animal feeds and fish meals used as animal feeds are greatly benefited by the practice of this invention. Not only are these compositions protected against oxidative deterooration but the inclusion of a composition of this invention in such materials inhibits the degradation of vitamins A, D and E and certain of the B complex vitamins. Examples of compositions containing oils derived from vegetable sources which are benefited by the practice of this invention include castor oil, soy bean oil, rapeseed oil, coconut oil, olive oil, palm oil, corn oil, sesame oil, peanut oil, babassu oil, citrus oils, cotton seed oil and various compositions containing these including peanut butter, peanuts and other whole nuts, salad dressings, margarine and other vegetable shortenings.

The compositions of this invention are also outstanding antioxidants for various organic compounds and polymeric materials including polystyrene, polyvinylchloride, polyvinyl acetate, various epoxide resins and polyester resins and polymers including the alkyds. However, in particular the compositions of this invention are outstanding antioxidants for saturated hydrocarbon synthetic polymers derived from polymerization of an aliphatic monoolefin hydrocarbon compound having preferably up to 5 carbon atoms and only a single unit of unsaturation per monomeric molecule. Examples of such monomers include ethylene, propylene, butylene, isobutylene, 2-methyl-4-butene, 2-methyl-3-butene and the like. Thus the polymers are homopolymers and copolymers of ethylene, propylene, butylene, isobutylene and the pentenes and are usually solid. Polyethylene and polypropylene are preferred polymers in the practice of this invention and they are derived from the polymerization of ethylene and proplyene respectively.

An aspect of this invention comprises premixing the benzyl ether and organic phosphonate prior to addition to the organic material to be protected. Thus, an embodiment of this invention is a composition comprising from about 0.067 to about 1000 parts by weight of a benzyl ether for each part of phosporous as an organic phosphonate.

In the above benzyl ether compounds, it is preferable that the groups designated by $R_3$ contain up to about 12 carbon atoms.

A preferred embodiment of this invention relates to the use of 3,5-dialkyl-4-hydrooxybenzyl ethers as above defined, in which $R_1$ and $R_2$ are both alkyl groups containing from 3 to 8 carbon atoms, both of said alkyl groups being branched on their respective alpha carbon atoms, and $R_3$ is a lower alkyl group—i.e., an alkyl group containing from 1 to 6 carbons atoms. The compounds of this preferred embodiment are particularly useful antioxidants in varous applications and are prepared in good yield.

Typical benzyl ether compounds employed in this invention include (3-methyl-5-isopropyl-4-hydroxybenzyl)-(methyl) ether, (3-methyl-5-tert-butyl-4-hydroxybenzyl)-(ethyl) ether, (3-ethyl-5-tertamyl-4-hydroxybenzyl)-(isopropyl) ether, (3-methyl-5-(2-heptyl)-4-hydroxybenzyl)-(butyl) ether, (3-ethyl-5-(1,1,3,3 - tetramethylbutyl) - 4-hydroxybenzyl)-(dodecyl) ether, (3,5-diisopropyl-4-hydroxybenzyl)-(cyclohexyl) ether, (3,5 - di - tert - butyl-4-hydroxybenzyl)-(p-ethylcyclohexyl) ether, (3-isopropyl-5-tert-butyl-4-hydroxybenzyl)-(benzyl) ether, (3-methyl-5-tert-amyl-4-hydroxybenzyl)-(p-methylbenzyl) ether, (3,5-di-tert-amyl-4-hydroxybenzyl)-(allyl) ether, (3,5-diisopropyl-4-hydroxybenzyl)-(7-octenyl) ether, (3,5-di-sec-butyl - 4 - hydroxybenzyl) - (4-hexenyl) ether, (3,5-diisopropyl - 4 -hydroxybenzyl) - (heptyl) ether, (3,5-di-tert-butyl-4-hydroxybenzyl)-(2-dodecyl) ether, and the like.

The preferred benzyl ether compounds are illustrated by (3,5-diisopropyl-4-hydroxybenzyl)-(methyl) ether, (3, 5-diisopropyl-4-hydroxybenzyl)-(isopropyl) ether, (3,5-diisopropyl-4-hydroxybenzyl)-(hexyl) ether, (3,5-di-tert-butyl-4-hydroxybenzyl)-(ethyl) ether, (3,5-di-tert-butyl-4-hydroxybenzyl)-(tert-butyl) ether, (3,5-di-tert-butyl-4-hydroxybenzyl)-(amyl) ether, (3-isopropyl-5-tert-butyl-4-hydroxybenzyl)-(methyl) ether, (3,5-di-tert-amyl-4-hydroxybenzyl)-(tert-amyl) ether, (3-isopropyl-5-(1,1,2,2-tetramethylpropyl)-4-hydroxybenzyl)-(ethyl) ether, (3,5-di-(1,1,3,3 - tetramethylbutyl)-4-hydroxybenzyl)-(1,1-dimethylbutyl) ether, and the like.

The phosphonates applicable to the present invention have the formula:

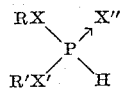

where R and R' are organic groups containing carbon and hydrogen and which may contain halogen, and X, X' and X'' are selected from the group consisting of oxygen and sulfur. Representative of these compounds are: di-n-butyl phosphonate, diisopropyl phosphonate, dioctyl phosphonate, bis(2-ethylhexyl)phosphonate, di-sec-butyl phosphonate, diisobutyl phosphonate, di-tert-butyl phosphonate, bis (1,3-dimethylbutyl)phosphonate, diamyl phosphonate, bis(2-chloro-1-methylethyl)phosphonate, ditolyl phosphonate, diethyl phosphonate, bis($\beta$-chloroisopropyl) phosphonate, O,S-dimethyl thiophosphonate, diphenyl phosphonate, ditolyl thiophosphonate, (tolyl) (isooctenyl)phosphonate, ditolyl phosphonate, dimethyl phosphonate, and methyl tolyl phosphonate. In general, these compounds have from 1 to about 12 carbon atoms in each organic group represented by R and R' in the above formula. These organic groups may be alkyl, aryl, aralkyl, or alkaryl and may comprise only carbon and hydrogen or may contain in addition, halogen.

The dialkyl phosphonates are preferred since compositions getting outstanding antioxidant effectiveness result from their employment. Another preferred class of phosphonates within the scope of this invention are those compounds represented by the above formula in which X, X' and X'' are oxygen. These are preferred since although they are not remarkably effective antioxidants in their own right, they have shown outstanding synergistic effectiveness when employed with the above benzyl ethers.

A preferred embodiment of this invention involves providing a lubricating oil normally susceptible to oxidative deterioration containing, in amount sufficient to inhibit such deterioration, a small quantity of the above combination of additives. It has been found in actual practice that small amounts of these mixtures very effectively stabilize lubricant compositions—e.g., petroleum hydrocarbon oils and synthetic oils—against oxidative deterioration.

To prepare the preferred lubricants of this invention, appropriate quantities of the benzyl ether and phosphonate are blended with the base oil to be protected. Suitable base oils include mineral oils and also synthetic diester oils, such as sebacates, adipates, etc., which find particular use as aircraft instrument oils, hydraulic and damping fluids, and precision bearing lubricants. All of these base oils are normally susceptible to oxidative deterioration, especially at elevated temperatures.

The finished lubricants of this invention have much greater oxidation stability and many other improved performance characteristics as compared with the corresponding base oils. In the case of lubricating oils of this invention, spectacular improvements are afforded, including markedly reduced engine wear characteristics, greatly improved oxidation stability and greatly reduced bearing corrosion properties.

The following examples illustrate various specific embodiments of this invention. The physical characteristics of the illustrative oils used in Examples 1-6 are as shown in Table I.

TABLE I.—PROPERTIES OF REPRESENTATIVE PETROLEUM HYDROCARBON OILS

| Oil | A | B | C | D | E | F |
|---|---|---|---|---|---|---|
| Gravity at 60° API | 30.3 | 30.5 | 28.8 | 31.1 | 20.5 | 31.0 |
| Viscosity, Saybolt: | | | | | | |
| Seconds at 100° F | 178.8 | 373.8 | 309.8 | 169.0 | 249.4 | 335.4 |
| Seconds at 210° F | 52.0 | 58.4 | 63.8 | 51.5 | 45.7 | 68.4 |
| Viscosity Index | 154.2 | 107.4 | 141.9 | 157.8 | 35.8 | 144.4 |
| Pour Point | −30 | +10 | −20 | −15 | | 0 |
| Flash Point | 410 | 465 | | | 365 | 385 |
| Sulfur, Percent | 0.2 | 0.3 | 0.3 | 0.3 | 0.3 | 0.1 |

*Example 1*

To 100,000 parts of Oil A is added with stirring 120 parts (0.12 percent) of (3-methyl-5-tert-butyl-4-hydroxybenzyl)-(isobutyl)-ether and sufficient dimethyl phosphonate to give 0.025 weight percent phosphorus. The resulting oil is found to possess greatly improved resistance to oxidative deterioration.

*Example 2*

To 100,000 parts of Oil B is added 1000 parts (1 percent) of (3 - isopropyl - 5 - tert-butyl-4-hydroxybenzyl)-(methyl)-ether and 0.5 weight percent of phosphorus as di-($\beta$-chloropropyl)phosphonate. On agitating this mixture, a homogeneous solution results and the resulting oil composition possesses enhanced oxidation resistance.

*Example 3*

With 100,000 parts of Oil C is blended 500 parts (0.5 percent) (3,5 - di-tert-butyl-4-hydroxybenzyl)-(methyl)-ether and 0.025 part of phosphorus as didodecyl phosphonate. The resulting oil possesses enhanced resistance against oxidative deterioration.

*Example 4*

To 100,000 parts of Oil D is added 1000 parts (1.0 percent) of 3,5-diisopropyl-4-hydroxybenzyl)-(ethyl)-ether and 0.5 weight percent phosphorus as diisobutyl phosphonate. The resulting oil is found to possess enhanced resistance against oxidative deterioration.

*Example 5*

With 100,000 parts of Oil E is blended 5000 parts (5 percent) of (3,5-di-tert-octyl-4-hydroxybenzyl)-(hexyl)-ether and 1.5 weight percent phosphorus as diamyl phosphonate. After mixing the resulting oil possesses enhanced resistance to oxidation.

*Example 6*

To 100,000 parts of Oil F is added 250 parts (0.25 percent) of (3 - isopropyl - 5 - tert-butyl-4-hydroxybenzyl)-(methyl)-ether and sufficient dimethyl-phosphonate to give 0.2 percent phosphorus. The resulting oil possesses greatly enhanced resistance against oxidative deterioration.

The additive combinations of this invention effectively stabilize such lubricating and industrial oils as crankcase lubricating oils, transformer oils, turbine oils, transmission fluids, cutting oils, gear oils, industrial oils, mineral white oils, glass annealing oils, and, in general, engine and industrial oils which are derived from crude petroleum and are normally susceptible to deterioration in the presence of air, particularly at elevated temperatures and most particularly in the presence of iron oxide.

In the lubricating oil compositions of this invention effective use can be made of other additives which are known to the art, such as detergent-dispersants, pour point depressants, viscosity index improvers, anti-foam agents, rust inhibitors, oiliness or film strength agents, dyes, and the like. Typical of the detergent additives that can be used in the compositions of this invention are metallic soaps of high molecular weight acids, such as aluminum naphthenates, calcium phenyl stearates, calcium alkyl salicylates, alkaline earth metal petroleum sulfonates, alkaline earth metal alkyl phenol sulfide (barium amyl phenol sulfide, calcium octyl phenol disulfide, etc.), metal salts of wax-substituted phenol derivatives, and the like. Of the viscosity index improvers and pour point depressants, effective use can be made of polymers of the esters of methacrylic acids and higher fatty alcohols and the corresponding polymers of esters of acrylic acid and higher fatty alcohols. These and other additives which can be employed in the compositions of this invention will now be well known to those skilled in the art.

The synthetic lubricants which are enhanced by the practice of this invention are, in general, non-hydrocarbon organic compositions; i.e., organic compositions which contain elements other than carbon and hydrogen. Examples of general classes of material which are protected against oxidative deterioration by the practice of this invention include diester lubricants, silicones, halogen containing organic compounds including the fluorocarbons; polyalkylene glycol lubricants, and organic phosphates which are suitable as hydraulic fluids and lubricants. The synthetic diester oils stabilized by the practice of this invention include sebacates, adipates, etc., which find particular use as aircraft instrument oils, hydraulic and damping fluids, and precision bearing lubricants. These diester oils are exceedingly difficult to stabilize under high temperature conditions. In this invention, use can be made of a wide variety of diester oils of the type described in Industrial and Engineering Chemistry, 39, 484–91 (1947). Thus, use can be made of the diesters formed by the esterification of straight chain dibasic acids containing from 4 to about 16 carbon atoms with saturated aliphatic monohydric alcohols containing from 1 to about 10 carbon atoms. Of these diester oils, it is preferable that the alcohol used in their preparation be a branched chain alcohol because the resultant diesters have very valuable lubricating properties and the inhibitor of this invention very effectively stabilizes these materials against oxidative deterioration. Thus, use can be made of oxalates, malonates, succinates, glutarates, adipates, pimelates, suberates, azelates, sebacates, etc.

The diester lubricants used in the lubricant compositions of this invention have the formula:

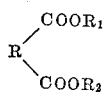

where R is an aliphatic hydrocarbon radical which may be saturated or unsaturated and has from 2 to 14 carbon atoms and $R_1$ and $R_2$ are straight or branched chain alkyl groups. The diesters utilized in the preferred lubricant compositions, include esters of succinic, glutaric, adipic, pimelic, suberic, azelaic and sebacic acid. Typical examples of such esters are diisooctyl azelate, di(2-ethylhexyl)sebacate, di-sec-amyl sebacate, diisooctyl adipate, di(2-ethylhexyl)adipate, di(2-ethylhexyl)azelate, di(1-methyl-4-ethyloctyl)glutarate, diisoamyl adipate, di(2-ethylhexyl)glutarate, di(2-ethylbutyl)adipate, ditetradecyl sebacate and di(2-ethylhexyl)pinate.

The preferred diesters are generally prepared by esterifying one mole of a dicarboxylic acid having the general formula:

where $x$ is an integer of from 2 to 8, with 2 moles of a branched chain alcohol containing at least 4 carbon atoms. Typical are the reactions of succinic, glutaric, adipic, pimelic, suberic or azelaic acid with sec-amyl alcohol, 3-ethyl butanol, 2-ethyl hexanol or the branched chain secondary alcohols undecanol or tetradecanol.

The preferred diester lubricant fluids have molecular weights ranging from about 300 to about 600 and freezing and pouring points from about −40° to less than about −100° F. Their flash and fire points range from about 300° F. to about 500° F. and their spontaneous ignition temperatures range from about 100° to about 800° F. The diesters made by reacting a dicarboxylic acid with a branched chain alcohol have been found to have superior viscometric properties as compared with diesters made by reacting dihydric alcohols with mono-carboxylic acids and thus, diesters prepared by the former method are preferred in formulating the lubricant compositions of this invention.

The diester oils may be formed by the reaction of a polycarboxylic acid with a mono-hydric alcohol, the reaction of a polyhydric alcohol with a mono-carboxylic acid, reaction between a polyhydric alcohol with a polycarboxylic acid, or combinations of the above reactions; for example, reaction of a polycarboxylic acid with a glycol and a mono-hydric alcohol, reaction of a glycol with a polycarboxylic acid and a mono-carboxylic acid, or the reaction of a glycol, a mono-hydric alcohol, a polycarboxylic acid and a mono-carboxylic acid. The acids may be mono-carboxylic aliphatic acids such as, propionic acid, valeric acid, 2-ethyl enanthic acid, 2,2-dipropyl butyric acid or 3-(2-methylhexyl)valeric acid. They may contain unsaturated linkages, such as, in senecioic acid, sorbic acid, or angelic acid; they may be polycarboxylic aliphatic acids such as succinic acid, glutaric acid, azelaic acid, 5-octene-1,8-dicarboxylic acid, or 3-hexene-2,3,4-tricarboxylic acid, and they may be aromatic or cycloaliphatic acids, such as cyclohexaneacetic acid, 1,4-cyclopentylenebis acetic acid, phthalic acid, hemimellitic acid, and terephthalic acid.

The alcohols used in preparing the polyester lubricant base materials may be aliphatic mono-hydric alcohols such as propanol, 2-ethyl-3-hexenol, 2-ethyl-4-propyl heptanol, 2-butenol, or 2-methyl propanol. They may be polyhydric aliphatic alcohols, such as 1,6-hexamethylene glycol, 1,10-decamethylene glycol, 2-hexene-1,6-diol, and 1,6-heptylene glycol, and they may be mono or polyhydric alicyclic or aromatic alcohols, such as 4-[m-(2-hydroxyethyl)phenyl]butanol, 3-(2-hydroxyethyl)cyclohexanebutanol, p-(hydroxymethyl)phenethyl alcohol, α-methyl-p-xylene-α,α'-diol, 1,4-cyclohexane-α,α'-diethyldimethanol, 2,3-bis(4-hydroxybutyl)benzyl alcohol, 4,4'-[3-(3-hydroxyhexyl)-o-phenylene]dibutanol, and 5[3-(3-hydroxypropyl)cyclopenta-2,4-dienylene]3-ethyl amyl alcohol.

Another class of synthetic lubricants which achieve enhanced oxidative stability by the practice of this invention includes the "silicone" lubricants. The term "silicone" as used in the specification and claims of this application is defined as a synthetic compound containing silicon and organic groups. In naming specific compounds, the nomenclature system recommended by the American Chemical Society Committee on Nomenclature, Spelling, and Pronunciation (Chem. Eng. News, 24, 1233 (1946)) will be used. Thus, the compounds which have the —Si—O—Si— linkages are the siloxanes. Derivatives of silane, $SiH_4$, in which one or more of the hydrogens in silane are replaced with organic groups are termed the silanes. Silicates and silicate ester compounds are named as oxy derivatives of silane and are called alkoxy or aryloxy silanes.

The silicone oils and greases serving as the base medium for the lubricant compositions of the invention include the polysiloxane oils and greases of the type, polyalkyl-, polyaryl-, polyalkoxy-, and polyaryloxy-, such as polydimethyl siloxane, polymethylphenyl siloxane, and polymethoxyphenoxy siloxane. Further included are silicate ester oils, such as tetraalkyloxy and tetraaryloxy silanes of the tetra-2-ethylhexy and tetra-p-tert-butylphenyl types, and the silanes. Also included are the halogen substituted siloxanes, such as the chlorophenyl polysiloxanes.

The polyalkyl, polyaryl, and polyalkyl polyaryl siloxanes are the preferred types of base medium for the silicon-containing lubricant compositons of the invention because of their high oxidative stability over a wide temperature range. The polyalkyl siloxanes, such as the dimethyl polysiloxane, are slightly preferred over the polyaryl, and polyalkyl polyaryl siloxanes because they show the least change in viscosity over a wide temperature range.

Certain halogen containing organic compounds have physical properties which render them particularly well suited as lubricants. Ordinarily, the halogen is either chlorine or fluorine. Typical of the chlorinated organic compounds suitable as lubricants are the chlorodiphenyls, chloronaphthalenes, chlorodiphenyl oxides and chlorinated paraffin waxes.

The fluorocarbon lubricants which are enhanced by this invention are linear polymers built up of a recurring unit which is

The fluorocarbon oils and greases are very stable chemically and have high thermal stability. These desirable physical properties appear to be closely related to the bond distances occurring in the fluorocarbon polymeric molecule, which may also contain chlorine bonded to carbon.

Polyalkylene glycol lubricants which are benefited by the practice of this invention are ordinarily the reaction product of an aliphatic alcohol with an alkylene oxide. The preferred alkylene oxides are ethyl oxide and propylene oxide. Depending upon the alcohol employed and the molecular weight of the compound, the polyalkylene glycol lubricants may be either water insoluble or water soluble. The molecular weights of these polymers may vary from about 400 to over 3,000. In general, the polyalkylene glycol lubricants are characterized by high viscosity indices, low API gravities, low points and they have the general formula:

$$R-(-O-C_nH_{2n})_xOH$$

where $n$ is a small integer and depends upon the alkylene oxide employed and $x$ is a large integer from about 10 to about 100 depending upon the molecular weight of the finished lubricant and R represents the hydrocarbon group derived from the particular aliphatic alcohol employed.

Another important class of synthetic materials which are enhanced by the practice of this invention are phosphate esters which are, in general, prepared by the reaction of an organic alcohol with phosphoric acid and have the general formula:

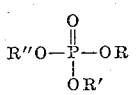

where R, R' and R" represent either hydrogen or an organic radical and where at least one of the groups represented by R, R' and R" is an organic radical. Typical of these materials is tricresylphosphate. The phosphate esters are in general characterized by excellent fire resistant properties and high lubricity. However, their thermal stability is such that they are ordinarily unsuited for high temperature applications above about 300° F. Other examples of phosphate esters include: tris(2-chloro-1-methylethyl)phosphate; tri-n-butyl-phosphate; tris(2-ethylhexyl)phosphate; triphenyl phosphate; tris(p-chlorophenyl)phosphate; diethyl-m-tolyl phosphate; p-chlorophenyl dimethyl phosphate; tris(2-n-butoxyethyl)phosphate; dimethyl-m-tolyl phosphate; di-n-propyl-m-tolyl phosphate; di-n-butyl phenyl phosphate; 1,3-butylene β-chlorisopropyl phosphate; methyl-di-m-tolyl phosphate; bis(2-chloro-1-methylethyl)-m-tolyl phosphate; dimethyl 3,5-xylyl phosphate; 4-chloro-m-tolyl dimethyl phosphate; 2 - ethyl - 1 - n - propyltrimethylene methyl phosphate; 4-chloro-m-tolyl 1-methyltrimethylene phosphate; dimethyl-n-octyl phosphate, and the like.

The synthetic base greases used in formulating lubricant compositions of the invention are formed by admixing a soap with an oil of any of the types described above. Such soaps are derived from animal or vegetable fats or fatty acids, wool grease; rosin, or petroleum acids. Typical examples are lead oleate, lithium, stearate, aluminum tristearate, calcium glycerides, sodium oleate and the like. In addition, the polyester greases may contain unreacted fat, fatty acids, and alkali; unsaponifiable matter including glycerol and fatty alcohols; rosin or wool grease; water; and certain additives which may function as modifiers or peptizers.

In formulating the grease compositions of this invention, greases prepared by admixing a lithium soap with the polyester oils are preferred as they have superior oxidative stability as compared with greases formulated with other soaps, such as the sodium calcium or lead soaps.

In preparing the improved lubricant compositions of this invention, an appropriate quantity of the benzyl ether and phosphonate are blended with the diester oil to be stabilized. If desired, preformed concentrated solutions of the stabilizer in the base lubricant can be prepared and then subsequently diluted with additional lubricant to the desired concentration. An advantage of this invention is the fact that the additives are easily and rapidly blended with the base oil. An additional advantage of this invention is that the additives are compatible with the usual additives that are frequently used to fortify lubricant compositions, such as detergent-dispersants, viscosity index improvers, dyes, anti-rush additives, anti-foaming agents and the like.

The following examples illustrate various specific embodiments of this invention.

*Example 7*

With 100,000 parts of di-(sec-amyl)sebacate having a viscosity of 210° F. of 33.8 Saybolt Universal seconds (SUS), a viscosity index of 133 and a molecular weight of 342.5 is blended 100 parts (0.1 percent) of (3-isopropyl-5-tert-butyl-4-hydroxybenzyl) - (methyl) - ether, and 0.05 weight percent of phosphorus as diamyl phosphonate. The resulting diester lubricant possesses greatly enhanced resistance against oxidative deterioration.

*Example 8*

To 100,000 parts of di-(2-ethylhexyl)sebacate having a viscosity at 210° F. of 37.3 SUS, a viscosity index of 152 and a molecular weight of 426.7 is added 1000 parts (1 percent) of [(3-methyl-5-(1,1,3,3 - tetramethylbutyl) - 4-hydroxybenzyl)]-(benzyl)-(ether), and 0.3 weight percent phosphorus as di-sec-hexyl phosphonate. After mixing, the resultant diester lubricant possesses greatly enhanced oxidation resistance.

*Example 9*

To 100,000 parts of di-(ethylhexyl)adipate having a viscosity at 210° F. of 34.2 SUS, a viscosity index of 121 and a molecular weight of 370.6 is added 2000 parts (2 percent) of (3-methyl-5-tert-butyl-4-hydroxybenzyl)-(ethyl)-ether, and 1.2 weight percent phosphorus as di-dodecyl phosphonate. After mixing, the resultant diester lubricant possesses outstanding resistance against oxidative deterioration.

*Example 10*

Three parts of (3-sec-hexyl-5-tert-amyl-4-hydroxybenzyl)-(isopropyl)-ether, and 0.75 weight percent phosphorus as diethyl phosphonate, are blended and mixed with 197 parts of a grease comprising 12.5 percent of lithium stearate, 1 part of polybutene (12,000 molecular weight), 2 percent of calcium xylyl stearate and 84.5 percent of di(2-ethylhexyl)sebacate, to prepare an improved grease of this invention.

*Example 11*

Blended with 750 parts of diisooctyl adipate having a viscosity of 35.4 SUS at 210° F., a viscosity of 57.3 SUS at 100° F., a viscosity of 3,980 SUS at $-40°$ F., a viscosity of 22,500 at $-65°$ F.; its viscosity index is 143, its ASTM pour point is below $-80°$ F. and its specific gravity (60° F./60°F.) is 0.926, are one part of (3-methyl-5-tert-butyl-4-hydroxybenzyl)-(methyl)-ether and 0.5 part of phosphorus as di-sec-butyl phosphonate.

*Example 12*

Thirty parts of (3,5-di-tert-butyl - 4 - hydroxybenzyl)-(ethyl)-ether and 50 parts of phosphorus as dimethyl phosphonate are mixed with 10,000 parts of a grease comprising 11 percent of lithium stearate, 1 percent of polybutene (12,000 molecular weight), 1 percent of sorbitan monooleate, 86.6 percent of di[1-(2-methyl-propyl)-4-ethyloctyl]sebacate.

*Example 13*

One part of (3,5 - di - isopropyl - 4 - hydroxybenzy)-(methyl)-ether and 0.5 part of phosphorus as methyl ethyl phosphonate, are blended with 100 parts of a polyethylpolyphenyl siloxane grease of medium weight consistency having a penetration of 240–280 (ASTM–217–48), a minimum melting point of 400° F. and a serviceable temperature range of from $-30$ to 400° F. (This siloxane grease is sold under the trade name "Dow-Corning 44."

*Example 14*

To a siloxane fluid having a viscosity of 71 centistokes at 25° C. and 24 centistokes at 75° C., a specific gravity of 1.03 at 25° C., a freezing point of $-70°$ C. and a flash point of 540° F., which is composed of a halogen substituted polyphenylpolymethyl siloxane is added sufficient (3-isopropyl-5-tert-butyl-4-hydroxybenzyl)-(butyl) - ether to give a composition containing 1.5 percent of this additive and sufficient diethyl phosphonate to give a composition containing 0.65 percent phosphorus. This oil has an extremely high degrees of resistance against oxidative deterioration due to the presence of the additive of this invention.

*Example 15*

To a poly(trifluorochloroethylene) having the formula $(CF_2CFCl)_x$ and an average molecular weight of 880, pour point of 5° C. and a viscosity of 45 centistokes at 160° F. is added 1.25 percent of (3,5-di-tert-butyl-4-hydroxybenzyl)-(octyl)-ether, and sufficient dimethyl phosphonate to give one percent phosphorous to prepare an improved lubricant of this invention.

*Example 16*

A composition consisting of 0.6 percent (3,5-di-tert-butyl-4-hydroxybenzyl)-(methyl)-ether, and 0.3 percent phosphorous as didecyl phosphonate is prepared by blending an appropriate quantity of these compounds with a fluorocarbon grease having a penetration of 267 millimeters at 77° F., 285 millimeters at 100° F. and 300 millimeters at 125° F. (ASTM–217-48); and a dropping point of at least 400° F. (ASTM–D–566–42). This grease is commercially available under the trade name "Fluorolube GR–544."

*Example 17*

To a polyalkylene glycol oil lubricant having a viscosity index of 148, ASTM pour point of $-55°$ F., a flash point of 300° F., a specific gravity of 0.979 and a Saybolt viscosity of 135 at 100° F. is added one percent of (3-methyl-5-tert-butyl-4-hydroxybenzyl) - (methyl) - ether and 0.5 weight percent phosphorus as diisopropyl phosphonate, to prepare an extremely oxidation resistant polyalkylene glycol lubricant.

*Example 18*

An improved lubricant of this invention comprising a chlorinated organic compound is prepared by admixing 0.5 percent of (3,5 - di - tert - butyl-4-hydroxybenzyl)-(methyl)-ether, and 0.25 weight percent phosphorus as dimethyl phosphonate with a chlorodiphenyl oil having a distillation range of from 554 to 617° F., a Saybolt viscosity at 100° F. of about 49, a pour point of −30° F. and a specific gravity of about 1.267.

*Example 19*

An improved hydraulic fluid and lubricant according to this invention is prepared by adding 2 percent of (3-isopropyl-5-tert-butyl-4-hydroxybenzyl)-(methyl) - ether and one percent phosphorous as dimethyl phosphonate to tricresyl phosphate.

The benzyl ether-phosphonate mixtures of this invention very effectively enhance the oxidation resistance of such diester oils as diethyl oxalate; di-sec-butyl malonate; di-(2-hexyl)succinate; di-(isoheptyl)pimelate; di-(3-decyl)seberate; di-sec-amyl glutarate; di-(isobutyl)glutarate; di-(2-ethylbutyl)glutarate; di-(2-ethylhexyl)glutarate; di-sec amyl adipate; di-(3-methylbutyl)adipate; di-ethyl adipate, di-2-ethylhexyl adipate; di-sec-amyl azelate, di-(isobutyl)azelate; di-(2-ethylbutyl)azelate; di-(2-ethylhexyl)azelate; di-sec-amyl sebacate; di-sec-butyl sebacate; di-(2-ethylhexyl)sebacate; the glutarates; adipates, azelates and sebacates of branched chain secondary alcohols, such as undecanol, tetradecanol; etc., and, in general, diesters of the type described above and in the literature as useful for synthetic lubricant purposes.

In the synthetic lubricant compositions of this invention effective use can be made of other additives which are known to the art, such as other inhibitors, detergent-dispersants, pour point depressants, viscosity index improvers, anti-foam agents, rust inhibitors, oiliness of film strength agents, dyes, and the like. Of the inhibitors which can be effectively used with synthetic lubricants in combination with the additives of this invention are sulfurized sperm oil, sulfurized terpenes, sulfurized paraffin wax olefins, alkyl phenols, lecithin, neutralized dithiophosphates, phosphorus pentasulfide-terpene reaction products, diphenylamine, phenylnaphthyl amine, β-naphthol, pyrogallol, and the like. Typical of the detergent additives that can be used in the compositions of this invention are metallic soaps of high molecular weight acids, such as aluminum naphthenates, calcium phenyl stearates, calcium alkyl salicylates, alkaline earth metal petroleum sulfonates, metal salts of wax-substituted phenol derivatives and the like. Of the viscosity index improvers and pour point depressants, effective use can be made of polymers of the esters of methacrylic acids and higher fatty alcohols and the corresponding polymers of esters of acrylic acid and higher fatty alcohols. These and other additives which can be employed in the composition of this invention will now be well known to those skilled in the art.

The antioxidant mixtures of this invention are also useful as additives to functional fluids and automatic transmission fluids. The primary constituent of a functional fluid is a refined mineral lubricating oil having carefully selected minimum viscosity of 49 Saybolt Universal seconds (SUS) at 210° F. and a maximum viscosity of 7,000 SUS at 0° F., generally a distillate oil, lighter than an SAE 10 motor oil. The oil usually amounts to between about 73.5 to about 97.5 percent by weight of the finished fluid. Preferably, the base oil is selected from a paraffin base distillate such as a Pennsylvania crude.

The fluids usually contain compounds which are characterized by containing one or more organic components which may be alkyl, aryl, alkaryl or aralkyl groups that are bonded to one or more metal atoms through coupling groups such as sulfonate, hydroxyl, carboxyl and mercaptan. The metal atoms may be aluminum, calcium, lithium, barium, strontium and magnesium. The organic components contain oil solubilizing groups such as high molecular weight straight or branched chain paraffins, aromatic or naphthenic rings, or contain a halogen. These metal compounds are present in the compounded fluid in a concentration range of between about 0.1 to about 5 percent by weight. These compounds include alkaline-earth metal salts of phenyl-substituted long chain fatty acids, alkaline-earth metal salts of the capryl or octyl esters of salicyclic acid, the alkaline-earth metal salts of petroleum sulfonic acids, the alkaline-earth metal salts of alkyl-substituted phenol sulfides, the salts of aluminum or the alkaline-earth metals with cetyl phenol, and the metal salts of wax-substituted phenol derivatives. Another class of additives are the so-called overbased phenates and sulfonates, which can be prepared by reaction between an alkyl phenol or alkyl phenol sulfide and an alkaline-earth metal oxide or hydroxide at an elevated temperature. The overbased phenate formed from the reaction contains up to two or three times as much metal as the normal phenate.

In addition, functional fluids may contain additional components which improve the properties of the fluid. Typical components and their concentration range in the fluid are as follows:

From about 1 to about 5 percent of an anti-squawk additive, usually a sulfurized oil, such as sulfurized sperm oil, sulfurized lard, sulfurized vegetable oil, sulfurized glyceride, or a sulfurized ester of fatty acids.

From about 0.05 to about 2 percent of a pour point depressant. Typical types of additives are wax-substituted naphthalenes, esters of wax-substituted phenol, polymerized unsaturated esters and acrylic polymers such as polymerized esters of methacrylic acid.

About 0.005 to about 0.1 percent of a foam inhibitor. Foam inhibitors include fatty acids and fatty acid esters, pine oil, alkyl lactates, higher ethers such as 2-(di-tert-amyl phenoxy) ethanol and mixtures of materials such as glycerol and sodium bis(2-ethylhexyl)sulfosuccinate.

From about 0.03 to about 0.1 percent of a rust preventive such as carboxylic acid derivatives including alkylated succinic acid, esters and partial esters of di- and polycarboxylic acids, esters and partial esters of hydroxy-substituted di- and polycarboxylic acids and alkyl-substituted acids containing at least two carboxylic acid groups joined by nitrogen, oxygen or sulfur esters of acids derived from oxidized petroleum; amine derivatives including hydroxy amines, hydroxy amidines, amine salts of partial esters of phosphorus acids, hydroxy amine salts of oxidized petroleum acids, hydroxy amine salts of fatty acids and long chain alkyl amines; organic sulfonates; long chain alkyl ketones; organic phosphates and phosphites; morpholine derivatives and phosphatides including lecithin and fatty acids.

About 0.1 to about 2 percent of an extreme pressure agent. These include organic compounds containing chlorine, phosphorus and sulfur, such as chlorinated waxes or a $P_2S_5$-terpene reaction product; organic phosphates and phosphites such as for example, tricresylphosphate or a zinc di-alkyl dithiophosphate and lead soaps such as lead naphthenate.

From about 0.05 to about 0.2 percent of a metal deactivator. Such compounds include complex organic nitrogen and sulfur-containing compounds, as for example, amines and sulfides. Also included are such compounds as organic dihydroxyphosphines, trialkyl and triaryl phosphites, certain diamines and soaps containing a metal such as tin, nickel, chromium, thallium or titanium.

From about 1 to about 10 percent of a viscosity index improver such as a polymerized olefin or isoolefin, butylene polymer or alkylated styrene polymer.

The following examples show typical functional fluids of this invention. The fluids are formed by mixing the ingredients together, while heating the oil to a temperature up to 200° F.

Example 20

A fluid of this invention is prepared by blending 80 parts of a conventionally-refined Pennsylvania mineral oil (99 SUS at 100° F.), 2 parts of [(3-methyl-5-(1,1,3,3-tetramethylbutyl) - 4-hydroxybenzyl)] - (benzyl) - ether, sufficient diphenyl phosphonate to give 1.0 percent phosphorus in the finished composition, 5 parts of barium petroleum sulfonate, 10 parts of a polyacrylate having a molecular weight of approximately 7,000 derived from a fatty alcohol such as cetyl or lauryl alcohol, 0.1 part of a dimethylsilicone polymer anti-foam agent, 2 parts of a dialkyl zinc dithiophosphate and 0.9 part of a dark, viscous liquid having a viscosity of 560 SUS at 210° F., a flash point of 420° F., a pour point of 30° F. and a specific gravity of 60/60° F. of 0.919.

Example 21

Another such fluid consists of 95 parts of a solvent-refined, light acid-treated, clay-contacted, solvent dewaxed paraffin base distillate mineral oil (110 SUS at 100° F.); 0.1 part of (3,5-di-tert-octyl-4-hydroxybenzyl) - (hexyl)-ether; 0.01 percent phosphorus as dihexyl phosphonate; 0.1 part of calcium octyl phenol sulfide; 2 parts of a sulfurized sperm oil having a sulfur content between 10–12 percent, a viscosity of 210° F. of 200 SUS and a pour point of 65° F.; 0.3 part of an ester of an aromatic acid and wax-alkylated phenol having a molecular weight of approximately 450; 2.5 parts of a linear pale color isobutylene polymer of a controlled molecular weight having a viscosity of 3,000 SUS at 210° F., a specific gravity 60/60° F. of 0.875.

Example 22

An automatic transmission fluid is made by mixing 97 percent of an oil blend comprising 59.0 parts of a solvent-extracted, Coastal oil, 40 SUS at 210° F.; 2.0 parts of (3-isopropyl-5-tert-butyl - 4 - hydroxybenzyl) - (methyl)-ether; 0.75 weight percent phosphorus as diheptyl phosphonate; 1.0 part of a barium phenol sulfide containing 2.4 percent barium, 2 percent calcium and 3.5 percent sulfur, having a viscosity of 126 SUS at 210° F., a flash point of 430° F., a pour point of 10° F. and a specific gravity 60/60° F. of 0.97; 1.0 part of sulfurized sperm oil.

Example 23

96 parts of a conventionally-refined Pennsylvania mineral oil (99 SUS at 100° F.); 0.5 percent phosphorus as dimethyl-phosphonate; 1.5 parts of (3-isopropyl-5-tert-butyl-4-hydroxybenzyl)-(butyl)-ether; 2 parts of a mixed barium phenol sulfide-calcium sulfonate containing 5.7 percent barium, 0.68 percent calcium and 2.9 percent sulfur, having a viscosity of 92 SUS at 210° F., a flash point of 410° F., a pour point of 10° F. and a specific gravity 60/60° F. of 0.988 are blended into an effective fluid of this invention.

As noted above, the compounds of this invention are also excellent antioxidants for saturated hydrocarbon polymers.

Polyethylene and polypropylene are, for example, hydrocarbon polymers derived from the polymerization of ethylene and propylene. This polymerization can be accomplished by a great variety of methods which lead to products of diverse properties. Polymers of any nature may advantageously be utilized for preparing compositions according to the present invention. The polymers which are employed may, for example, be similar to those which may be obtained by polymerizing ethylene in a basic aqueous medium and in the presence of polymerization favoring quantities of oxygen under relatively high pressures in excess of 500 or 1,000 atmospheres at temperatures between 150 and 275° C. Or, if desired, they may be similar to the essentially linear and unbranched polymers ordinarily having greater molecular weights which may be obtained under relatively low pressures of 1 to 100 atmospheres using such catalysts to polymerize the ethylene as mixtures of strong reducing agents and compounds of Groups IVB, VB and VIB metals of the Periodic System; chromium oxide on silicated alumina; hexavalent molybdenum compounds; and charcoal supported nickel-cobalt. The polymer which results from these various polymerization processes may have a molecular weight in the range from 1300 to over 1,000,000 depending on the particular conditions of polymerization employed.

There are several methods available for preparing the inhibited hydrocarbon polymer compositions of this invention. Thus the blending of the additives of this invention, with a polymer such as, for example, polyethylene, may be carried out on open rolls, on internal mixers or may be accomplished by mixing with extrustion. It is also possible to prepare concentrated batches of the polymer containing excessive amounts of the additive and then mix the concentrate with additional polymer to prepare a composition of this invention. The preferred method of compounding the polymers is by milling on heated open rolls at slightly elevated temperatures by methods well-known to the art. The temperature range employed is sometimes critical as certain polyethylenes will not melt at low temperatures and tend to stick to the rolls at high temperatures. The additive may be initially mixed with the polymer in the dried state or may be first dissolved in a suitable solvent, then sprayed on the polymer and milled in.

Examples of the hydrocarbon polymer compositions of this invention prepared as described above follow. All parts and percentages are by weight in these examples.

Example 24

To 1,000 parts of polyethylene produced by oxygen catalyzed reaction under a pressure of 20,000 atmospheres and having an average molecular weight of 40,000 is added and mixed 2 parts of (3-methyl-5-tert-butyl-4-hydroxybenzyl)-(methyl)-ether and 0.025 percent phosphorus as diamyl phosphonate. The resulting composition has a greatly increased oxidative stability.

Example 25

To 100 parts of polyisobutylene having an average molecular weight of 100,000 is added 0.5 part of (3,5-di-tert-butyl-4-hydroxybenzyl)-(methyl)-ether and 0.3 percent phosphorus as dimethyl phosphonate. The oxidative stability of the polymer is greatly increased by the addition of this compound.

Example 26

A linear polyethylene having a high degree of crystallinity (up to 93 percent) and below one ethyl branched chain per hundred carbon atoms, a density of about 0.96 gram per milliliter and which has about 1.5 double bonds per 100 carbon atoms is treated with $50 \times 10^{-6}$ roentgens of $\beta$-radiation. To the thus irradiated polymer is added 0.1 percent of (3,5-diisopropyl-4-hydroxybenzyl)-(ethyl)-ether; and 0.05 percent phosphorus as diisopropyl thio phosphonate. The resulting product has improved stability characteristics.

Example 27

To a polyethylene having an average molecular weight of 1500, a melting point of 88–90° C. and a specific gravity of 0.92 is added one percent of (3-isopropyl-5-tert-butyl-4-hydroxybenzyl)-(methyl)-ether and 0.6 percent phosphorus as dimethyl thionophosphonate. After milling in the antioxidant an extremely oxidation resistant product results.

Example 28

Two parts of [(3-methyl-5-(1,1,3,3-tetramethylbutyl)-4-hydroxybenzyl)]-(benzyl)-ether and 1.0 percent phosphorus as diphenyl phosphonate are added with milling to 100 parts of a low density polyethylene prepared by high pressure polymerization and which has an average molecular weight of about 20,000. The resulting product is vastly improved in its oxidative stability.

*Example 29*

To a polyisobutylene polymer having an average molecular weight of 35,000 is added sufficient (3,5-di-tert-octyl-4-hydroxybenzyl)-(hexyl)-ether to give a composition containing 0.3 percent of the benzyl ether and 0.05 percent phosphorus as discresyl phosphonate. The composition has improved antioxidant properties due to the presence of the antioxidant mixture of this invention.

*Example 30*

To 1,000 parts of a solid polypropylene polymer having a density of 0.905 and a Rockwell hardness greater than 85, in which isotactic is added and blended to 5 parts of (3-sec-hexyl-5-tert-amyl-4-hydroxybenzyl)-(isopropyl)-ether and 0.5 percent phosphorus as dimethyl phosphonate.

*Example 31*

To an isotactic polypropylene having a tensile strength greater than 4300 p.s.i. and a compressive strength of about 9,000 p.s.i. is added sufficient (3-methyl-5-tert-butyl-4-hydroxybenzyl)-(ethyl)-ether to give a composition containing 1.5 percent of the benzyl ether and sufficient diisobutyl phosphonate to give 0.85 percent phosphorus.

*Example 32*

To a wax-like polypropylene having a melting point above 130° C. and a molecular weight of about 4,000, a density of 0.913 is added 0.2 percent of (3,5-di-isopropyl-4-hydroxybenzyl)-(methyl)-ether and 0.05 percent phosphorus as dioctyl phosphonate. The antioxidant is added to the polypropylene in the molten state and the mixture is allowed to solidify into the desired shape. A polypropylene product of outstanding oxidative stability results.

In addition to the additives of this invention saturated hydrocarbon polymers may contain other compounding and coloring additives including minor proportions of carbon black, elastomers, polyvinyl compounds, carboxylic acid esters, urea-aldehyde condensation products, flame retarding agents such as antimony trioxide and chlorinated hydrocarbons and various pigment compositions designed to impart color to the finished product.

Other hydrocarbon polymers which are stabilized against oxidative deterioration according to this invention include natural rubber, GR-S and GR-N rubbers, butyl rubber, methyl rubber, polybutene rubber, butadiene rubbers, piperylene rubbers, dimethylbutadiene rubbers, polystyrene, polybutadiene, polyisobutylene, polyethylene, isobutylene-styrene copolymer and, in general, elastomeric hydrocarbon polymers which are normally susceptible to oxidative deterioration. Such polymers are well known in the art and besides being susceptible of oxidative deterioration are characterized by having molecular weights above about 10,000. The problem resulting from heat, light and catalyst promoted oxidative deterioration in such hydrocarbon polymers is intensified because of free radical formation within the polymers. This leads to various forms of physical and chemical degradation such as chain scission, autocatalytic oxidation, reduction in molecular weight and loss of original physical properties. The net result is that the desirable useful and necessary properties of the polymers which are associated with their original chemical structure and molecular weights are lost to a greater or lesser extent unless the polymers are stabilized against such deterioration.

Typical stabilized hydrocarbon polymers of this invention are illustrated by the following specific examples wherein all parts and percentages are by weight.

*Example 33*

To a synthetic rubber master batch comprising 100 parts of GR-S rubber having an average molecular weight of 60,000, 5 parts of mixed zinc propionate-stearate, 50 parts of carbon black, 5 parts of road tar, 2 parts of sulfur and 1.5 parts of mercaptobenzothiazole is incorporated 1.5 parts of (3-isopropyl-5-tert-butyl-4-hydroxybenzyl)-(methyl)-ether and 0.45 percent phosphorus as dimethyl phosphonate. This batch is then cured for 60 minutes at 45 pounds per square inch of steam pressure.

*Example 34*

Five percent of (3,5-di-tert-butyl-4-hydroxybenzyl)-(octyl)-ether and 1.25 percent phosphorus as diethyl thionophosphonate are added to a synthetic rubber master batch comprising 100 parts of GR-S rubber having an average molecular weight of 100,000, 5 parts of zinc stearate, 50 parts of carbon black, 5 parts of road tar, 2 parts of sulfur and 1.5 parts of mercaptobenzothiazole. This batch is then cured as described in Example 31.

*Example 35*

Two parts of (3-isopropyl-5-tert-butyl-4-hydroxybenzyl)-(butyl)-ether and 0.5 percent phosphorus as dixylyl phosphonate are incorporated in 100 parts of raw butyl rubber prepared by the copolymerization of 90 percent of isobutylene and 10 percent of isoprene and having an average molecular weight of 100,000.

*Example 36*

To a master batch of GR-N synthetic rubber comprising 100 parts of GR-N rubber having an average molecular weight of 75,000, 5 parts of zinc stearate, 50 parts of carbon black, 5 parts of road tar, 2 parts of sulfur and 2 parts of mercaptobenzothiazole is added to 2 percent based on the weight of the batch of (3-isopropyl-5-tert-butyl-4-hydroxybenzyl)-(methyl)-ether, and 0.85 percent phosphorus as di(phenylphenyl)phosphonate.

*Example 37*

0.25 percent by weight of (3,5-di-tert-butyl-4-hydroxybenzyl)-(methyl)-ether and 0.075 percent phosphorus as diisobutylphosphonate are incorporated in polybutadiene having an average molecular weight of 50,000.

*Example 38*

To natural rubber (Hevea) is added 0.1 percent of (3-methyl-5-tert-butyl-4-hydroxybenzyl)-(methyl)-ether and 0.005 percent phosphorus as di-dodecylphosphonate.

The above examples illustrate the improved compositions of this invention. Other such compositions and the methods of preparing the same will now be apparent to one skilled in the art.

The stabilizers of this invention are also excellent additives to tetraalkyllead antiknock compositions. The tetraalkyllead antiknock agents which are stabilized according to this invention are represented by such compounds as tetramethyllead, tetraethyllead, tetrapropyllead, dimethyldiethyllead, trimethylethyllead, and the like, or mixtures thereof. Such compounds containing from 4 to about 12 carbon atoms, one atom of lead and a plurality of lead-to-carbon bonds, are capable of increasing the octane quality of gasoline when employed therein in antiknock quantities—0.5 to 6.5 grams of lead per gallon. Halogen-containing compounds such as triethyllead bromide may also be stabilized according to this invention.

The scavengers which are preferably, but not necessarily, present in the antiknock compositions of this invention are organic halide compounds which react with the lead during combustion in the engine to form volatile lead halide. The halogen of these scavengers has an atomic weight between 35 and 80; that is, the active scavenging ingredient is chlorine and/or bromine. Such scavengers include carbon tetrachloride, propylene dibromide, 2-chloro-2,3-dibromobutane, 1,2,3-tribromopropane, hexachloropropylene, mixed bromoxylenes, 1,4-dibromobutane, 1,4-dichloropentane, β,β'-dibromodiisopropyl ether, β,β'-dichlorodiethyl ether, trichlorobenzene, dibromotoluenes, and in general those disclosed in U.S. Patents 1,592,954; 1,668,022; 2,364,921; 2,479,900; 2,479,901; 2,479,902; 2,479,903; and 2,496,983. In short, the preferred scavengers contain only elements selected from the group consisting of carbon, hydrogen, bromine, chlorine and oxygen. The amount of scavengers used is from about 0.5 to about 2.0 theories, a theory being defined as the quantity required to react with the lead to form lead halide—i.e., 2 atoms of halogen per atom of lead. When we use mixtures of bromine-containing and chlorine-containing scavengers, particularly bromo and chlorohydrocarbons, we can employ concentrations and proportions as described in U.S. Patent 2,398,281. Such concentrations are sufficient to control the amount of deposits formed in the engine.

The tetraalkyllead antiknock compositions of this invention may contain other ingredients such as dyes for identification purposes, metal deactivators, diluents and the like.

Antiknock compositions containing tetraalkyllead antiknock agents are employed by adding them to gasoline to improve the antiknock quality thereof. Such gasolines both before and after addition of the antiknock fluid are benefited by the practice of this invention. Thus gasolines to which have been added a compound of this invention are found to be more stable upon prolonged periods of storage.

The following examples illustrate gasoline embodiments of this invention.

*Example 39*

To 10,000 parts of a grade 115/145 aviation gasoline containing 4.5 ml. of tetraethyllead per gallon which has an initial boiling point of 110° F. and a final boiling point of 330° F. and an API gravity of 71.0° is added 0.5 percent of (3-methyl-5-tert-butyl-4-hydroxybenzyl)-(methyl)-ether and 0.4 percent phosphorus as dioctyl phosphonate.

*Example 40*

To a gasoline containing 26.6 percent aromatics, 20.8 percent olefins and 52.6 percent saturates and which has an API gravity of 62.1° is added 0.1 percent of (3,5-di-tert-butyl-4-hydroxybenzyl)-(methyl)-ether and 0.01 percent phosphorus as diisobutyl thiophosphonate.

Similarly, other additive mixtures of this invention may be added with benefit to gasoline of whatever nature and however processed.

The additive combinations of this invention are also extremely useful in inhibiting and stabilizing non-petroleum fats and oils normally subject to the deteriorating effect of oxidative rancidity. In particular, compounds of this invention are excellent stabilizers for animal fats and oils, especially lard, against the effects of rancidity.

In formulating the stabilized non-petroleum fats and oils of this invention, the additive or combination of additives is incorporated by appropriate means into the substrate to be stabilized. Thus, in the case of animal, vegetable and fish oils, the additive or combination of additives is added in appropriate quantity and the resulting mixture agitated to insure homogeneity. Where the substrate is a solid at room temperatures—e.g., fats, butter, etc.—the mixing is preferably carried out at temperatures above the melting point of the substrate. When a combination of additives is used, they can be mixed with the substrate as a preformed mixture or can be separately blended therewith in either order. Generally speaking, it is desirable to first dissolve the additive combination in high concentration in a small portion of the material to be stabilized. The resulting concentrated solution then blended with the remaining bulk. Another way of facilitating the formulation of the composition of this invention is to pre-dissolve the additive or combination of additives in a suitable solvent, such as ethanol, glycerol, propylene glycol, etc., and then mix the resulant solution with the material to be stabilized. However, the preferred way of formulating the compositions of this invention is to predissolve the additive mixture in a fatty acid partial ester of a polyhydroxy compound, notably a monoglyceride, and then blend this mixture with the material to be stabilized. The nature of these monoglyceride compositions is well known in the art and may be made from either animal or vegetable fats, with or without previous hydrogenation. These compositions generally contain about 40 percent of the monostearyl, monooleayl, and/or monopalmityl glycerides or mixtures thereof with the balance comprising a mixture of di- and tri-glycerides. Molecularly distilled monoglycerides may also be used for this purpose. These compositions will be apparent from the following examples.

*Example 41*

With 1,000 parts of melted lard is mixed 1 part (0.1 percent) of (3-isopropyl-5-tert-butyl-4-hydroxybenzyl)-(methyl)-ether and 0.05 percent phosphorus as diisopropyl phosphonate. After cooling the lard can be stored for long periods of time without the development of rancidity.

*Example 42*

With 5,000 parts of cottonseed shortening is blended 5 parts (0.1 percent) of (3-methyl-5-(1,1,3,3-tetramethylbutyl)-4-hydroxybenzyl)-(benzyl)-ether and 0.1 percent phosphorus as diamyl phosphonate. The resulting shortening has improved resistance against oxidative rancidity.

*Example 43*

To 10,000 parts of corn oil are added with stirring 20 parts (0.2 percent) of (3,5-diisopropyl-4-hydroxybenzyl)-(ethyl)-ether and 2 parts (0.02 percent) of phosphorus as dimethyl phosphonate. The resulting corn oil has improved storage stability characteristics.

Preparation of the phosphonates used in this invention, such as diisobutyl phosphonate, di(2,4-dichlorocyclohexyl)phosphonate, di(3-chloro-4-methylphenyl)phosphonate, etc., follows the general procedures described in Industrial and Engineering Chemistry, 49, 1871, 1957).

The 3,5-dialkyl-4-hydroxylbenzyl ethers employed in this invention are prepared as described in Patent 2,838,571 issued to Allen H. Filbey on June 10, 1958. In general, the reaction for preparing these compounds comprises reacting a 2,6-dialkyl phenol with formaldehyde and a monohylric alcohol in the presence of a catalytic quantity of a metallic hydroxide condensation catalyst.

The synergistic antioxidant mixtures of this invention may be pre-mixed prior to addition to the material to be protected. Thus, an embodiment of this invention is a mixture containing from 0.005 to 1000 parts of phenolic compound per part of phosphite.

*Example 44*

Sufficient (3-methyl-5-tert-butyl-4-hydroxybenzyl)-(isobutyl)-ether and bis(2-ethylhexyl) phosphonate are blended together to give a composition containing 0.005 part of the phenol per part of phosphonate.

*Example 45*

(3-isopropyl-5-tert-butyl-4-hydroxybenzyl)-(methyl)-ether and dimethyl phosphonate are compounded into a mixture containing 1000 parts of the phenol per part of phosphonate.

*Example 46*

A mixture containing 2.0 parts of (3,5-di-tert-butyl-4-hydroxybenzyl)-(methyl)-ether per part of phosphorus is prepared by mixing appropriate quantities of (3,5-di-tert-butyl-4-hydroxybenzyl)-(methyl)-ether and di-sec-butyl phosphonate.

Example 47

(3-methyl-5-tert-butyl-4-hydroxybenzyl)-(methyl)-ether and diamyl phosphonate are mixed in such proportion that the resulting mixture has 4 parts of the phenol per part of phosphorus.

To illustrate the outstanding benefits obtained by the practice of this invention, a standard oil oxidation test is used. The equipment and test procedure described by Kroger et al., Erdol and Kohle, 2, page 398 (1949), served as a basis for the tests. The equipment and procedures are slightly modified in order to make the oxidizing conditions more strenuous. In this manner the test lubricants are subjected to severe oxidizing conditions in order to conclusively establish the effectiveness of additives under very adverse conditions. Furthermore, the modifications are found to provide results which correlated extremely well with test results of other standard procedures, including actual engine tests.

The equipment consists of a reaction cell connected with an open end manometer whereby the total uptake of oxygen by the oil is determined by noting the drop in height of the mercury in the manometer. The test oil sample is placed in the reaction cell which is then flushed with oxygen and the temperature is then raised and held at that selected for the test until the substrate oil undergoes catastrophic oxidation which is shown by a rapid oxygen uptake. In all cases, the test oil is deliberately contaminated with iron hexoate as an oxidation promoter. In tests of this nature, the oxidation stability of a test lubricant is ordinarily determined by measuring its induction period, that is, the time required for catastrophic deterioration under the above outlined conditions. The longer the induction period, the more stable the lubricant. In tests of this nature the antioxidant combinations of this invention exhibit induction periods which cannot be accounted for as the additive effect of the phenol and phosphonate employed. In fact, most of the phosphonates, by themselves, contribute substantially no antioxidant improvement to the oil.

To further illustrate the useful properties of the novel mixtures of this invention, recourse is had to the Polyveriform Oxidation Stability Test as described in the paper entitled "Factors Causing Lubricating Oil Deterioration in Engines" (Ind. and Eng. Chem., Anal. Ed., 17, 302 (1945)). See also "A Bearing Corrosion Test for Lubricating Oils and Its Correlation With Engine Performance" (Anal. Chem., 21, 737 (1949)). This test effectively evaluates the performance of lubricating oil antioxidants. The test equipment procedure employed and correlations of the results with engine performance are discussed in the first paper above cited. By employing various compounds of this invention in oxygen-sensitive lubricating oil, effective inhibition of oxidation deterioration is achieved.

To demonstrate the outstanding performance of the compositions of this invention as antioxidants for industrial lubricants, comparative tests were conducted using the method and apparatus essentially as described in the publication first above-mentioned. One minor modification was that the steel sleeve and copper test piece described in this publication were omitted from the apparatus. In these tests an initially additive-free, 95 V.I. solvent-refined SAE-10 crankcase oil was used. The principal test conditions consisted of passing 70 liters of air per hour through the test oil for a total period of 20 hours while maintaining the oil at a temperature of 300° F. to make the test more representative of actual use conditions. Oxidation deterioration of the oil was further promoted by employing as oxidation catalysts 0.05 percent by weight of ferric oxide (as ferric 2-ethyl hexoate) and 0.10 percent by weight of lead bromide, both of these amounts being based upon the weight of oil employed. In tests of this nature employed on the lubricating oil alone, with a phosphonate and benzyl ether alone and with a combination of benzyl ether and phosphonate, outstanding improvements in antioxidant effectiveness are shown by the compositions of this invention.

We claim:

1. Lubricating oil normally susceptible to oxidative deterioration protected by a small antioxidant quantity of a mixture of (A) a 3,5-dialkyl-4-hydroxybenzyl ether having the general formula:

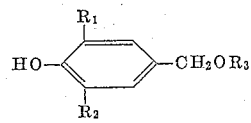

wherein $R_1$ is an alkyl group containing from 3 to 8 carbon atoms and is branched on the alpha carbon atom, $R_2$ is an alkyl group containing from 1 to 8 carbon atoms, and $R_3$ is selected from the group consisting of alkyl of from 1 to 12 carbon atoms, cycloalkyl of from 6 to 8 carbon atoms, aralkyl of from 7 to 8 carbon atoms and alkenyl of from 3 to 8 carbon atoms and (B) a dialkyl phosphonate having hydrogen bonded to phosphorus, said phosphonate having the formula:

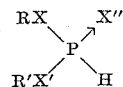

wherein R and R' are alkyl groups of from 1 to 12 carbon atoms and X, X' and X" are selected from the group consisting of oxygen and sulfur, said composition containing from about 0.01 to about 5 weight percent of said hydroxybenzyl ether and from about 0.005 to about 1.5 weight percent of phosphorus as said phosphonate, based on the weight of the material to be protected.

2. The composition of claim 1 wherein said lubricating oil is a petroleum hydrocarbon oil.

3. The composition of claim 1 wherein said lubricating oil is a synthetic lubricating oil.

4. The composition of claim 1 wherein said hydroxybenzyl ether is selected from the class consisting of (3,5-di-tert-butyl-4-hydroxybenzyl)-(methyl)-ether, (3-methyl-5-tert-butyl-4-hydroxybenzyl)-(methyl)-ether, (3-isopropyl-5-tert-butyl-4-hydroxybenzyl)-(methyl)-ether, (3,5-di-tert-butyl-4-hydroxybenzyl)-(ethyl)-ether and (3,5-diisopropyl-4-hydroxybenzyl)-(ethyl)-ether and said phosphonate is selected from the class consisting of dimethyl phosphonate, diisobutyl phosphonate, di-tert-butyl phosphonate and di-sec-butyl phosphonate.

5. The composition of claim 1 wherein said hydroxybenzyl ether is (3-methyl-5-tert-butyl-4-hydroxybenzyl)-(methyl)-ether.

6. The composition of claim 1 wherein said hydroxybenzyl ether is (3-isopropyl-5-tert-butyl-4-hydroxybenzyl)-(methyl)-ether.

7. The composition of claim 1 wherein said hydroxybenzyl ether is (3,5-di-tert-butyl-4-hydroxybenzyl)-(methyl)-ether.

8. The composition of claim 1 wherein said phosphonate is dimethyl phosphonate.

9. The composition of claim 1 wherein said phosphonate is diisobutyl phosphonate.

10. The composition of claim 2 wherein said hydroxybenzyl ether is (3,5-di-tert-butyl-4-hydroxybenzyl)-(methyl)-ether.

11. The composition of claim 10 wherein said dialkyl phosphonate is di-tert-butyl phosphonate.

12. The composition of claim 10 wherein said dialkyl phosphonate is dimethyl phosphonate.

13. The composition of claim 1 wherein said hydroxybenzyl ether is (3,5-di-tert-butyl-4-hydroxybenzyl)-(ethyl)-ether.

14. The composition of claim 1 wherein said hydroxybenzyl ether is (3,5-diisopropyl-4-hydroxybenzyl)-(ethyl)-ether.

15. The composition of claim 1 wherein said phosphonate is di-sec-butyl phosphonate.

16. Lubricating oil containing a mixture of (3,5-di-tert-butyl-4-hydroxybenzyl)-(methyl)-ether and dimethyl phosphonate.

References Cited in the file of this patent

UNITED STATES PATENTS

| | | |
|---|---|---|
| 2,101,632 | Weinrich | Dec. 7, 1937 |
| 2,169,185 | Shoemaker et al. | Aug. 8, 1939 |
| 2,220,851 | Schreiber | Nov. 5, 1940 |
| 2,234,379 | Martin | Mar. 11, 1941 |
| 2,413,353 | Hunter | Dec. 31, 1946 |
| 2,432,095 | Frey | Dec. 9, 1947 |
| 2,634,824 | Drake et al. | Apr. 14, 1953 |
| 2,838,571 | Filbey | June 10, 1958 |
| 2,954,345 | Filbey | Sept. 27, 1960 |

FOREIGN PATENTS

| | | |
|---|---|---|
| 654,968 | Great Britain | July 4, 1951 |

OTHER REFERENCES

G. M. Kosolapoff: Organophosphorus Compounds, John Wiley & Sons, Inc., N.Y. (1950), pp. 193–4.